US006244817B1

(12) United States Patent
Ngo

(10) Patent No.: US 6,244,817 B1
(45) Date of Patent: Jun. 12, 2001

(54) METHOD AND APPARATUS FOR A FAN NOISE CONTROLLER

(75) Inventor: Hieu Thien Ngo, Gilbert, AZ (US)

(73) Assignee: McDonnell Douglas Corporation, Mesa, AZ (US)

( * ) Notice: Subject to any disclaimer, the term of this patent is extended or adjusted under 35 U.S.C. 154(b) by 0 days.

(21) Appl. No.: 09/231,504

(22) Filed: Jan. 14, 1999

Related U.S. Application Data

(63) Continuation-in-part of application No. 09/231,333, filed on Jan. 13, 1999, now abandoned, which is a continuation-in-part of application No. 08/761,740, filed on Dec. 5, 1996, now abandoned.

(51) Int. Cl.[7] .................................................. F01D 25/04
(52) U.S. Cl. .......................................... 415/119; 415/914
(58) Field of Search .......................... 415/11, 57.1, 57.4, 415/58.5, 58.7, 119, 168.2, 168.4, 173.1, 914; 60/725

(56) References Cited

U.S. PATENT DOCUMENTS

| 4,692,091 | * | 9/1987 | Ritenour | 415/119 |
| 5,308,225 | * | 5/1994 | Koff et al. | 415/57.3 |
| 5,707,206 | * | 1/1998 | Goto et al. | 415/914 |
| 5,762,034 | * | 6/1998 | Foss | 415/914 |

FOREIGN PATENT DOCUMENTS

| 55-35173 | * | 3/1980 | (JP) | 415/914 |
| 58-202399 | * | 11/1983 | (JP) | 415/58.5 |

OTHER PUBLICATIONS

Xin Zhang and John A. Edwards, Experimental Investigation of Supersonic Flow over Two Cavities in Tandem, pp. 1182–1190, AIAA Journal, vol. 30, No. 5, May 1992.

Richard G. Holz and Ahmed A. Hassan, Numerical Model for Circulation–Control Flows, pp. 701–707, AIAA Journal, vol. 32, No. 4, Apr. 1994.

Englar et al., Development of the Circulation Control Wing to Provide STOL Potential for High Performance Aircraft, pp. 1–11 (No Date).

* cited by examiner

Primary Examiner—Christopher Verdier
(74) Attorney, Agent, or Firm—Snell & Wilmer L.L.P.

(57) ABSTRACT

A fan system, such as a turbofan, marine propeller, or a cooling fan, includes a fan noise control system for reducing noise generated by the fan system. The noise control system may be configured to reduce either broadband noise, blade-passage noise, or both. In particular, the fan noise control system suitably includes a pre-swirl generator configured to provide a layer of fluid upstream from the fan blades. The layer swirls in the direction of the fan's rotation, reducing the angular velocity differential between the fan blades and the incident fluid. In addition, the fan noise control system may also include a fluid seal generator configured to create a fluid barrier between the fan blade tips and the interior surface of the fluid flow channel. The fluid seal inhibits leakage flow between the fan blade tips and the interior surface as well as the formation of blade vortices. By minimizing the blade wake and the blade tip vortices without adding solid surfaces, noise tends to diminish.

12 Claims, 5 Drawing Sheets

METHOD AND APPARATUS FOR A FAN NOISE CONTROLLER

CROSS REFERENCE TO RELATED APPLICATIONS

This is a continuation-in-part of application Ser. No. 09/231,333, filed Jan. 13, 1999, which is a continuation-in-part of application Ser. No. 08/761,740, filed Dec. 5, 1996, now abandoned.

BACKGROUND OF THE INVENTION

1. Field of the Invention

The present invention generally relates to noise control, and more particularly, to methods and apparatuses for controlling noise and vibrations generated by rotating blades of a fan.

2. Background of Invention

Virtually all large modern transport aircraft, especially civil aircraft, use turbofan engines. A turbofan engine essentially comprises a turbojet with a large low-pressure compressor, in which airflow is discharged as a relatively cool and slow propulsive jet. The turbofan exhibits superior propulsive efficiency and fuel consumption characteristics over ordinary turbojets. Perhaps the most important advantage of turbofan engines over turbojets in civil aviation, however, is the dramatically lower noise level.

Despite the improvement over conventional turbojets, however, turbofan engines still produce a powerful roar. The sound of turbofan engines continues to generate animosity among the public towards the aviation industry. Noise concerns produce resistance to the construction of new, more convenient airports, and promote strict noise control regulations. Compliance with these regulations often presents an enormous expense to aircraft owners because engines or even entire aircraft may require replacement.

In some cases, compliance may even be impossible. Current solutions for reducing engine noise have met with limited success. Although a turbofan produces less jet noise than a turbojet, the fan itself has become a source of considerable noise. Much of the fan noise may be produced by interaction between unsteady fluid flows and solid surfaces. Such interactions may be attributed to inflow disturbances, such as the inlet boundary layer interacting with the blades of the fan, or the fan wakes and blade tip vortices interacting with the stator vanes or support struts downstream from the fan. In addition, as fans become larger and more powerful, the contribution of the fan to the overall noise of the engine becomes more pronounced.

A typical acoustic spectrum for a fan includes both broadband noise and higher amplitude noise at particular frequencies relating to the fan rotation rate. The higher amplitude noise associated with the fan rotation rate, referred to here as blade-passing noise, is generated, in considerable part, by aerodynamic interaction between blade load or blade thickness disturbance flows and solid surfaces. This interaction occurs, for example, when the downstream stator vanes or support struts respond to flow fluctuations caused by the upstream fan blades. Under high loading conditions, the most significant of such disturbances to the flow downstream are caused by the development of blade leading edge vortices and stronger blade tip vortex shedding. Consequently, fan blade-passing noise is typically most severe under high load conditions.

Broadband noise, on the other hand, is generated from multiple sources. Some broadband noise sources depend on three-dimensional unsteady flows within a rotor or stator blade row. Such three-dimensional flows may comprise a vortex at the blade tip adjacent to the surface, due to the leakage of fluid through the tip clearance gap. Also, three-dimensional flow may include blade tip vortices which are generated by the deflection of the flow streamlines within the annular wall boundary layer. Such leakage and blade tip vortex flows may increase the fan broadband noise.

To minimize fan noise, a noise control system should attenuate both the blade-passing noise as well as the fan broadband noise. Absorbing the fan noise with acoustic wall treatments or engine hushkitters is somewhat effective, but only produces relatively small reductions in fan noise and often adversely affects engine performance. Active noise control solutions, on the other hand, show promise, but the techniques are not fully developed, require precise and costly control systems, and typically address only blade-passing noise corresponding to the rotation rate of the fan.

Furthermore, fan noise presents a problem in many applications other than aircraft engines. For example, cooling fans are very common as household appliances, in computers, and in other applications. In many of these applications, controlling the noise generated by the fan is a common design objective. As fans become more powerful, however, noise control often becomes more difficult.

SUMMARY OF THE INVENTION

A system according to various aspects of the present invention comprises a fan noise control system for reducing noise associated with a fan system. The system includes components for controlling broadband noise and blade-passing noise associated with the rotation rate of the fan. In particular, a fan noise control system according to various aspects of the present invention suitably includes a pre-swirl generator configured to provide a layer of fluid upstream from the fan blades which is swirling in the direction of the fan's rotation. The layer of swirling fluid reduces the angular velocity differential between the fan blades and the incident fluid.

In addition, the fan noise control system may further include a fluid seal generator configured to generate a barrier between the blade tips of the fan and the interior surface of the fluid flow channel. The fluid seal or barrier may comprise a layer of fluid between the fan blade tips and the interior surface which rotates in the same direction as the fan blades. Consequently, the fluid seal inhibits leakage flow between the fan blade tips and the interior surface, as well as formation of blade vortices.

Thus, a system according to various aspects of the invention reduces noise associated with a rotating fan. The pre-swirl generator tends to reduce the blade-passing noise component. In addition, the fluid seal generator tends to diminish the broadband noise associated with leakage flow and blade vortices. Because the pre-swirl generator and fluid seal generator provide force in the direction of the fan rotation, both components also tend to unload the fan, thus improving performance of the fan system and further reducing noise.

These and other advantages of a system according to various aspects of the present invention will be apparent to those skilled in the art upon reading and understanding the following detailed description with reference to the accompanying figures.

BRIEF DESCRIPTION OF THE DRAWING

The subject matter of the invention is particularly pointed out and distinctly claimed in the concluding portion of the specification. The invention, however, both as to organization and method of operation, may best be understood by reference to the following description taken in conjunction with the claims and the accompanying drawing, in which:

DETAILED DESCRIPTION OF PREFERRED EXEMPLARY EMBODIMENTS

Figure 1:
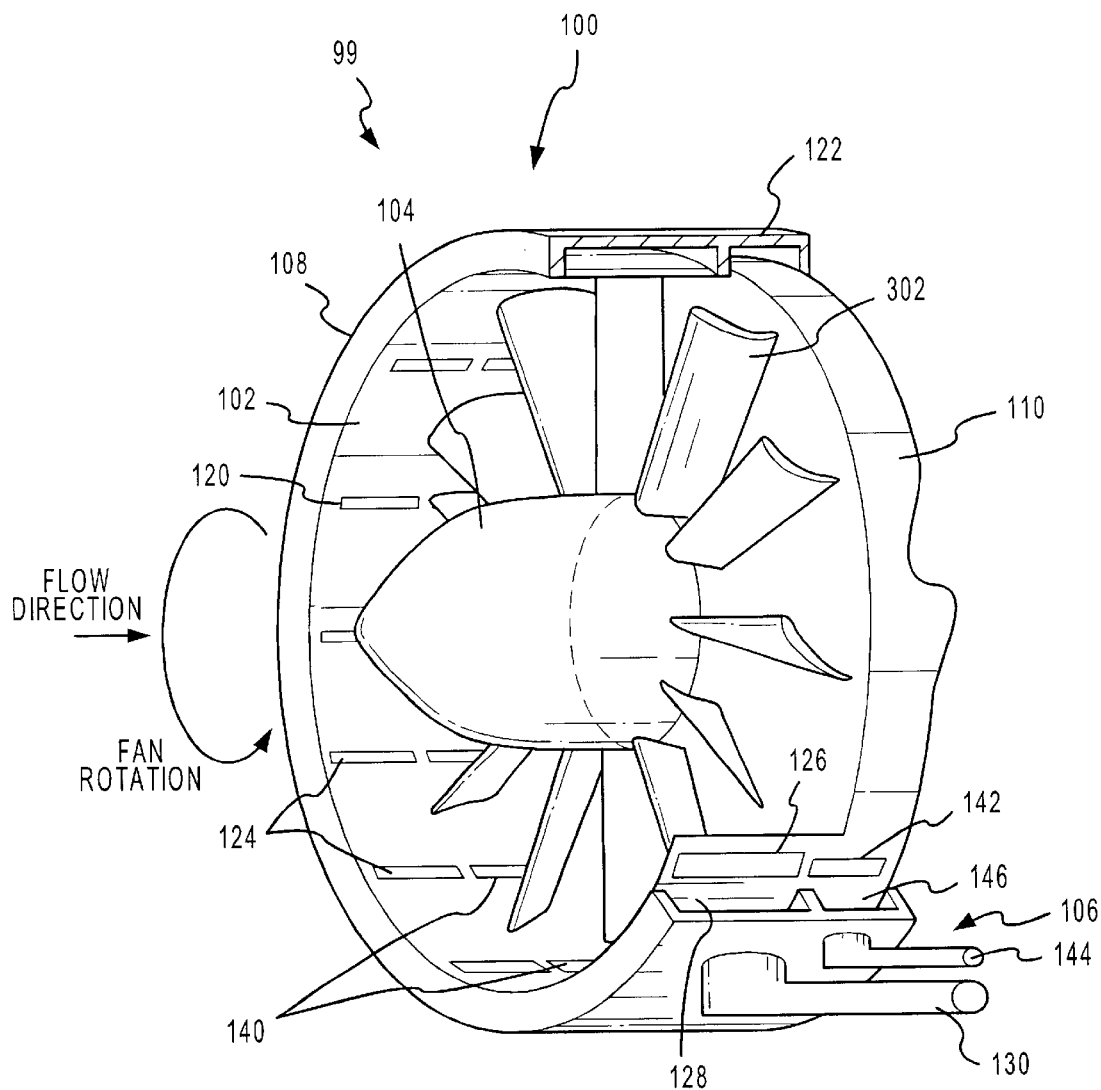
FIG. 1 is an isometric, partially cutaway view of a fan system including a fan noise control system according to various aspects of the present invention.
Figure 3:
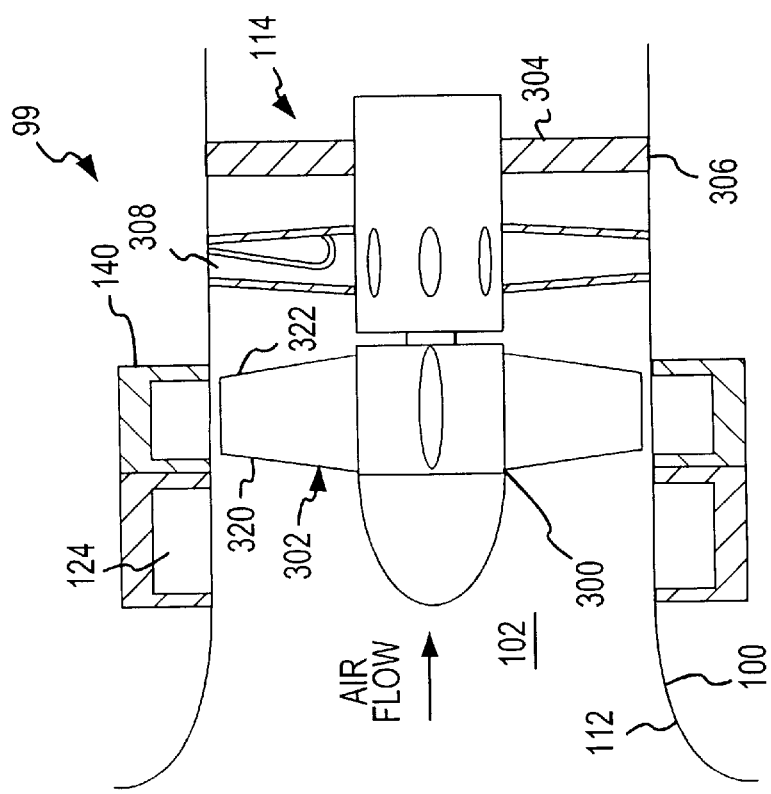
FIG. 3 is a cross-sectional side view of the fan system of FIG. 1.

Referring now to FIGS. 1 and 3, a fan system 99 according to various aspects of the present invention suitably comprises: a housing 100 having a fluid flow channel 102; a power plant (not shown); a fan assembly 104; and a fan noise control system 106. The present embodiment is described in conjunction with an aircraft turbofan system, though various aspects of the present invention may be used in conjunction with any system having rotating blades including, for example, commercial cooling fans, marine propulsion systems, blow dryers, and the like. In particular, the housing 100 suitably defines the fluid flow channel 102 in which the fan assembly 104 is disposed. Various components of the fan assembly 104 suitably rotate within the fluid flow channel 102, and the fan assembly 104 is suitably coupled to the power plant. The power plant provides power to rotate the fan within the housing 100.

The fan assembly 104 suitably comprises any apparatus having rotating blades. In the present embodiment, the fan assembly 104 suitably comprises: a hub 300; a plurality of blades 302 mounted on the hub 300 for driving a fluid, such as air or water, through the flow channel 102; and a support system 304 for supporting the hub 300 and blades 302 within the housing 100. The hub 300 suitably comprises a conventional hub 300 for a commercial aircraft engine, generally comprising, for example, a rigid, substantially cylindrical member disposed coaxially along the longitudinal axis of the housing's 100 fluid flow channel 102.

The blades 302 are suitably mounted rigidly on the exterior of the hub 300 so that rotation of the hub 300 induces corresponding rotation of the blades 302. The blades 302 suitably comprise conventional fan blades, such as turbofan blades, for urging fluid through the fluid flow channel 102. The number and configuration of the blades 302 may be determined according to the application of the fan system 99. The blades 302 preferably extend sufficiently far from the hub 300 such that the diameter of the plurality of blades 302 is slightly less than the diameter of the fluid flow channel 102.

The support system 304 supports the hub 300 and blades 302 such that the hub 300 and blades 302 may rotate within the housing 100, and may comprise any suitable support system. In the present embodiment, the support system 304 suitably comprises at least one support strut 306, or a stator vane 308, and a bearing (not shown). The hub 300 is suitably mounted on the bearing to facilitate rotation of the hub 300 relative to the bearing. The bearing may comprise any sort of suitable bearing, such as a ball bearing, a bearing surface, or a magnetic bearing. The support struts 306 suitably rigidly maintain the position of the bearing within the fluid flow channel 102 so that, other than the angular motion, the relative positions of the hub 300 and the blades 302 remain substantially constant with respect to the housing 100. Similarly, the stator vane 308 rigidly maintains the position of the bearing, and further controls the back pressure behind the blades 302 to inhibit fluid flow in the upstream direction. It should be noted that, typically, fan system 99 includes either support struts 306 or stator vanes 308 according to the application, though some applications may suitably include both.

The power plant provides power to rotate the blades 302 of the fan assembly 104 within the fluid flow channel 102 and urge fluid through the channel 102 accordingly. The power plant may comprise any appropriate power plant for the particular application of the fan system 99, such as an electric motor, internal combustion engine, or nuclear power plant. In the present embodiment, the power plant suitably comprises any conventional power plant for commercial aircraft engines. The power plant is coupled to the fan assembly 104 to facilitate rotation of the blades 302 within the fluid flow channel 102.

The housing 100 is comprised of any suitable material for the particular application of the fan system 99. In the present embodiment, any materials used in conjunction with conventional commercial aircraft engine housings 100 may be used, for example steel, titanium, and various composite materials and alloys. The housing 100 is suitably generally cylindrical and includes an exterior wall 108 and an interior wall 110. The interior wall 110 defines the fluid flow channel 102 through the housing 100 in which the fan assembly 104 is suitably disposed. Further, the housing 100 suitably includes open ends to define a fluid inlet 112 and a fluid outlet 114 so that fluid may flow through the inlet 112, fluid flow channel 102, and outlet 114, respectively.

The fan noise control system 106 comprises a system for reducing noise generated by the fan system 99. The fan noise control system 106 according to various aspects of the present invention diminishes blade-passing noise at specific frequencies associated with the fan blade rotation rate. The fan noise control system 106 may also be suitably configured, additionally or alternatively, to reduce broadband noise.

In this regard, it is instructive to note the difference between stall margin and noise. It is often incorrectly asserted that vane stall and noise are mutually inclusive conditions and that when vane stall exists, noise also exists due to fluid instabilities caused by the vane stall. Generally speaking, as the impeller blade speed increases, noise and vibration related to its movement through the fluid also increases. Stall margin refers to the situation where, under certain conditions (e.g., at high blade speeds), all or a portion of the blade surfaces experience low momentum flow, which can give rise to a dangerous condition of excessive noise and vibration known as surge.

While it is true that noise increases dramatically as the stall margin is approached, it is not true that improving stall margin necessarily decreases noise under normal operating conditions. The stall margin limits the operational range of the fan, but under safe (and desirable) operating conditions, the fan does not reach this stage. The present fan noise control system 106, while tending to reduce noise under stall conditions, primarily tends to control noise produced under normal operating conditions, which are typically at blade speeds well below those of stall conditions and/or exhibiting different flow characteristics than those associated with stall conditions. Indeed, due to the nature of the noise/blade-speed curve prior to and after the point of stall margin, schemes for improving the stall margin can actually increase noise that is experienced under normal conditions.

This situation can be analogized to road tires. Under normal conditions there is a certain amount of road noise associated with an automobile's tires. Naturally, this noise substantially increases when the tire is punctured or otherwise looses inflation. It is possible to design tires (using internal support structures and the like) such that they remain relatively stable even after a considerable loss of air. This solution effectively shifts the point at which catastrophic failure occurs, but it does not address the general problem of road noise. In fact, such systems typically result in higher levels of road noise.

Similarly, stall margin improvement and noise reduction are largely independent goals. It is true that when vane stall exists, noise also exists due to fluid instabilities caused by the vane stall, but the non-existence of stall (or improvement in stall margin) does not necessarily imply the non-existence or reduction of noise.

Figure 6:
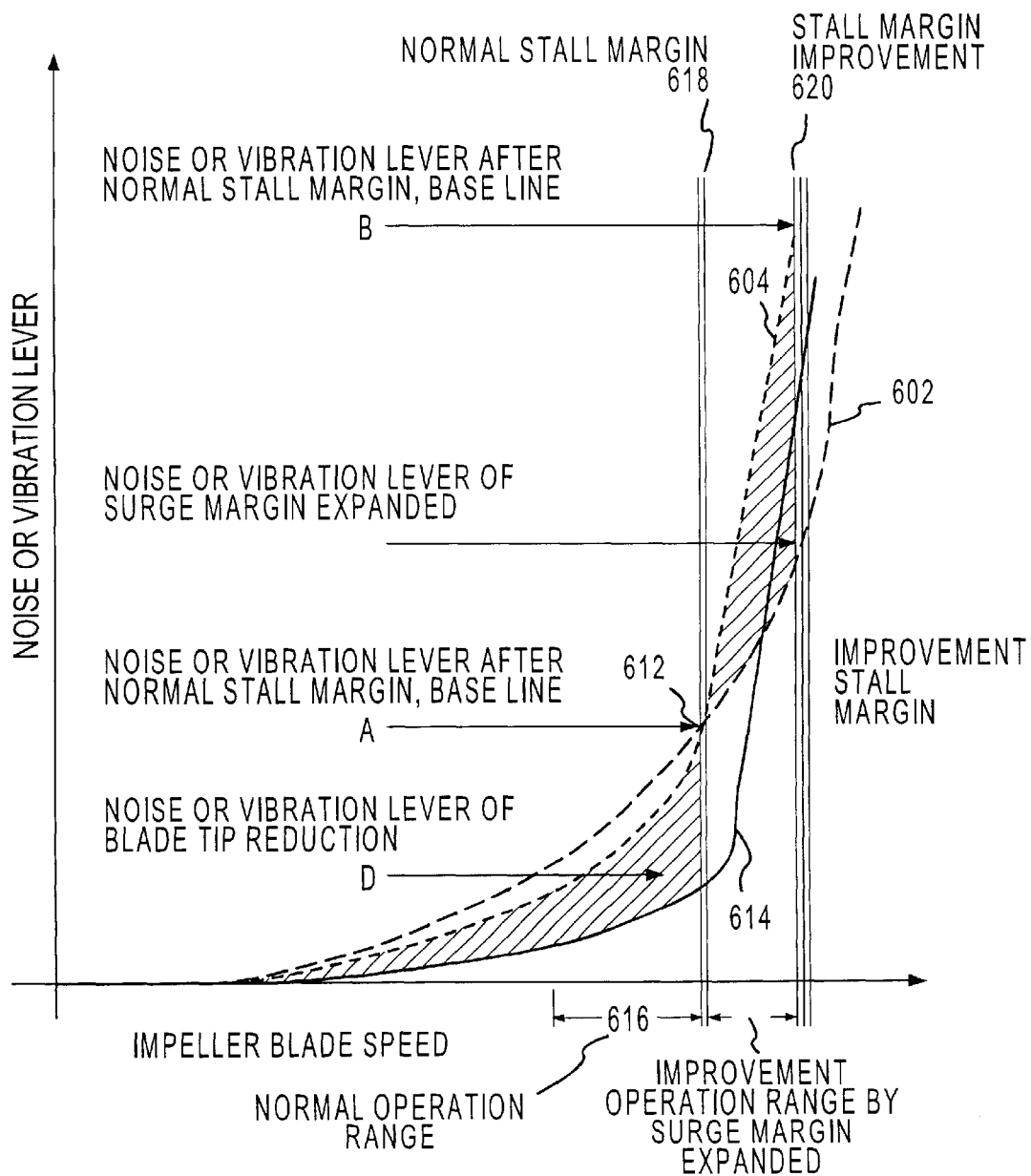
FIG. 6 is a graph depicting noise as a function of blade-speed for a typical fan blade system.

This distinction is apparent in FIG. 6, which depicts, qualitatively, the relationship between noise and impeller blade speed. A typical prior art fan system exhibits a noise characteristic 604 which increases significantly at the stall margin point 612. Systems for improving stall margin such as that depicted by curve 602 typically effectively shift the onset of stall from the baseline level 618 to an improved level 620. As a result, however, the noise level within the normal operational range 616 increases. In contrast, systems in accordance with various aspects of the present invent comparable to those indicated by curve 614 As shown, the overall noise level within normal operational range 616 is decreased, irrespective of the effect on stall margin. It should be appreciated, however, that exemplary curve 614 shown in FIG. 6 is not intended as a quantitative limitation of the present invention.

Referring again to FIGS. 1 and 3, a fan noise control system 106 according to various aspects of the present invention suitably includes a pre-swirl generator 120 and/or a fluid seal generator 122. The pre-swirl generator 120 is suitably configured to control blade-passing noise, including the noise of the blades 302 as well as corresponding harmonics and combination frequencies, and the fluid seal generator 122 is configured to control noise associated with fluid leakage and vortex formation.

The pre-swirl generator 120 affects the fluid flow into the channel 102 from the inlet 112. In general, pre-swirl generator 120 is configured to reduce fan noise by providing a layer of rotating fluid upstream of the fan, wherein the pressure of said layer of rotating fluid is substantially uniform at every angle in a plane parallel to the plane of rotation of said fan. In particular, the pre-swirl generator 120 unloads the fan blades 302 by producing a layer of swirling fluid upstream of the blades 302. The layer of swirling fluid swirls in the same direction as the rotation of the blades 302, thus reducing the relative angular velocity of the fan blades 302 with respect to the incident fluid. As a result, the noise generated by the rotation of the blades 302 diminishes.

In addition, the pre-swirl generator 120 suitably reduces noise which may be generated by the blades 302 passing through fluid having variable pressure with respect to the angular position of the blades 302. As each blade 302 rotates, noise may be generated if the pressure of the fluid incident upon any point on the blade 302 changes. The magnitude of the noise typically corresponds to the magnitude of the change in pressure. The pre-swirl generator 120 preferably generates the layer of swirling fluid so that the layer has substantially uniform pressure regardless of angular position in the plane of rotation with respect to the hub 300.

Figure 2:
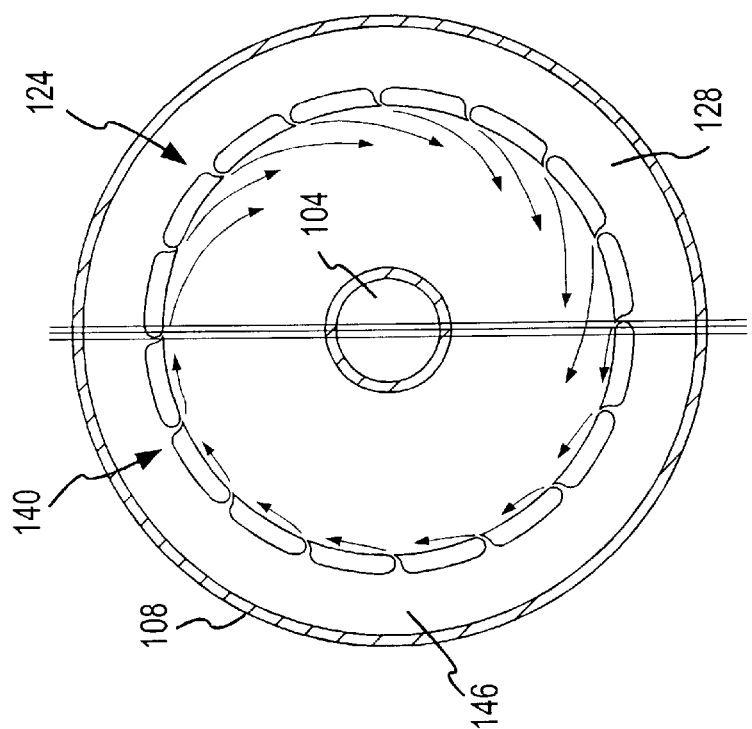
FIG. 2 is a partially cutaway front view of the fan system of FIG. 1.

The pre-swirl generator 120 suitably comprises any system for creating a layer or part of a layer of swirling fluid upstream of the blades 302. Preferably, however, no structural surfaces are added by the pre-swirl generator 120 to the flow channel that may potentially create wake flow. Referring now to FIG. 2, in the present embodiment, the pre-swirl generator 120 suitably comprises an inlet guide ring (IGR) 124, suitably formed into the housing 100 upstream of the blades 302. The IGR 124 suitably comprises a plurality of jets or vents, such as circulation controlled slots (CCSs) 126; a duct 128; and a fluid supply 130. The IGR fluid supply 130 suitably comprises any source of pressurized fluid, such as air. In the present embodiment, the IGR fluid supply 130 comprises the exhaust of the engine itself using a feedback configuration, but the IGR fluid supply 130 may comprise any other type of appropriate fluid source. In certain applications, the pressure produced by the IGR fluid supply 130 may be selectably variable to optimize performance of the noise control system 106 at different blade rotation rates. The IGR fluid supply 130 is connected to the IGR duct 128 and forces fluid through the IGR CCSs 126 via the IGR duct 128. The IGR duct 128 suitably comprises a substantially annular duct formed in the housing 100 and circumscribes the flow channel 102.

The IGR CCSs 126 suitably comprise a plurality of slots formed in the interior wall 110 of the housing 100 upstream of the blades 302 and connected to the IGR fluid supply 130 via the IGR duct 128. The IGR CCSs 126 affect the flow of fluid from the inlet 112 into the flow channel 102. In particular, the IGR CCSs 126 are configured to eject fluid from the IGR fluid supply 130 into the flow channel 102 upstream from the blades 302.

The number, location, and configuration of the IGR CCSs 126 can be configured according to the fan system's 99 application, rotation speed, and size. Further, the IGR CCSs 126 may be configured according to any suitable size, shape, or technique to create a layer of swirling fluid in front of the blades 302. For example, the IGR CCSs 126 may comprise any suitable sort of vent, nozzle, or other mechanism for providing a fluid. In the present embodiment, each IGR CCS 126 is defined by four surfaces. Two of the surfaces are parallel to the plane of rotation of the blades 302, and are formed in the interior wall 110 of the housing 100 upstream from the blades 302. The other two surfaces, substantially parallel to the longitudinal axis of the flow channel 102, are configured to direct fluid into the flow channel 102.

Figure 4:
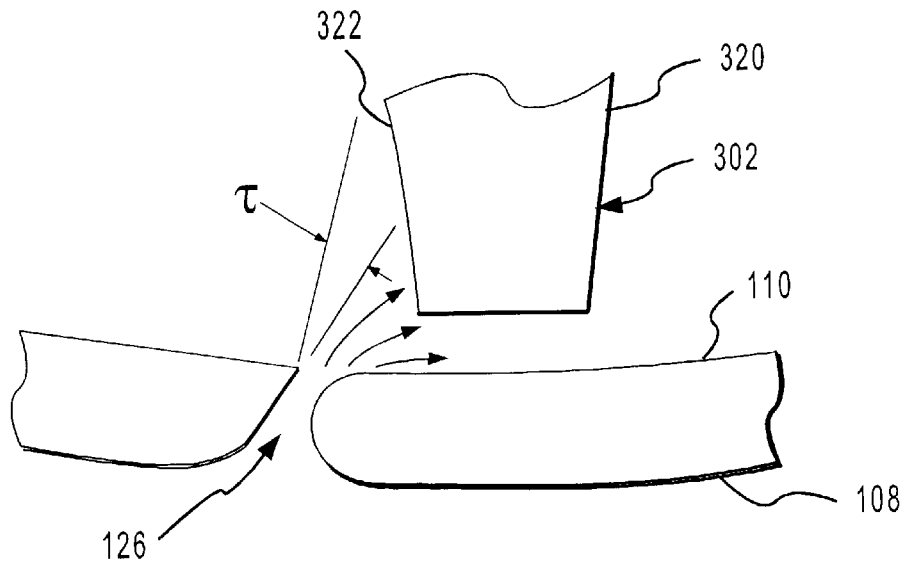
FIG. 4 is a detailed cross-sectional view of an IGR CCS.

For example, referring now to FIG. 4, a first surface A suitably intersects a plane tangent to interior wall 110 at an angle τ. The angle τ may be any suitable angle, for example 30° to 70°, typically about 45°, though the angle may be adjusted to the particular application and characteristics of fan system 99. A second surface B forms a curving interface with the interior wall 110 of the housing 100. Fluid traveling near surface A substantially maintains its alignment with the surface A as it ejects from the IGR CCS 126. Fluid traveling near surface B, however, remains near the interior wall 110 of the housing 100 due to the so called Coanda effect. Specifically, the Coanda effect relates to the behavior of a thin sheet of fluid tangentially ejected over the rounded edge of an airfoil, control surface, or the like. Due to a balance between the centrifugal forces and static pressure of the jet sheet, the fluid layer effectively adheres to the surface contour. For additional information regarding the Coanda effect, see, for example, Holz et al., *Numerical Model for Circulation-Control Flows*, AIAA Journal (Vol. 32, No. 4, April 1994).

Fluid ejected through the IGR CCSs 126 thus forms a layer of fluid, swirling in the same direction as the blades 302 rotate. The thickness of the layer of swirling fluid is determined according to the angle τ, and is suitably as thick as the fan blade 302 span. Fluid entering through the inlet 112 substantially smoothly mixes with the layer of swirling fluid generated by the IGR 124. Consequently, the velocity differential between the rotating blades 302 and the incident fluid is reduced and the load on the fan system 99 decreases, thus diminishing the noise generated by the fan system 99. Further, no solid surface that might create wake flow is added in the fluid flow channel 102.

Figure 7:
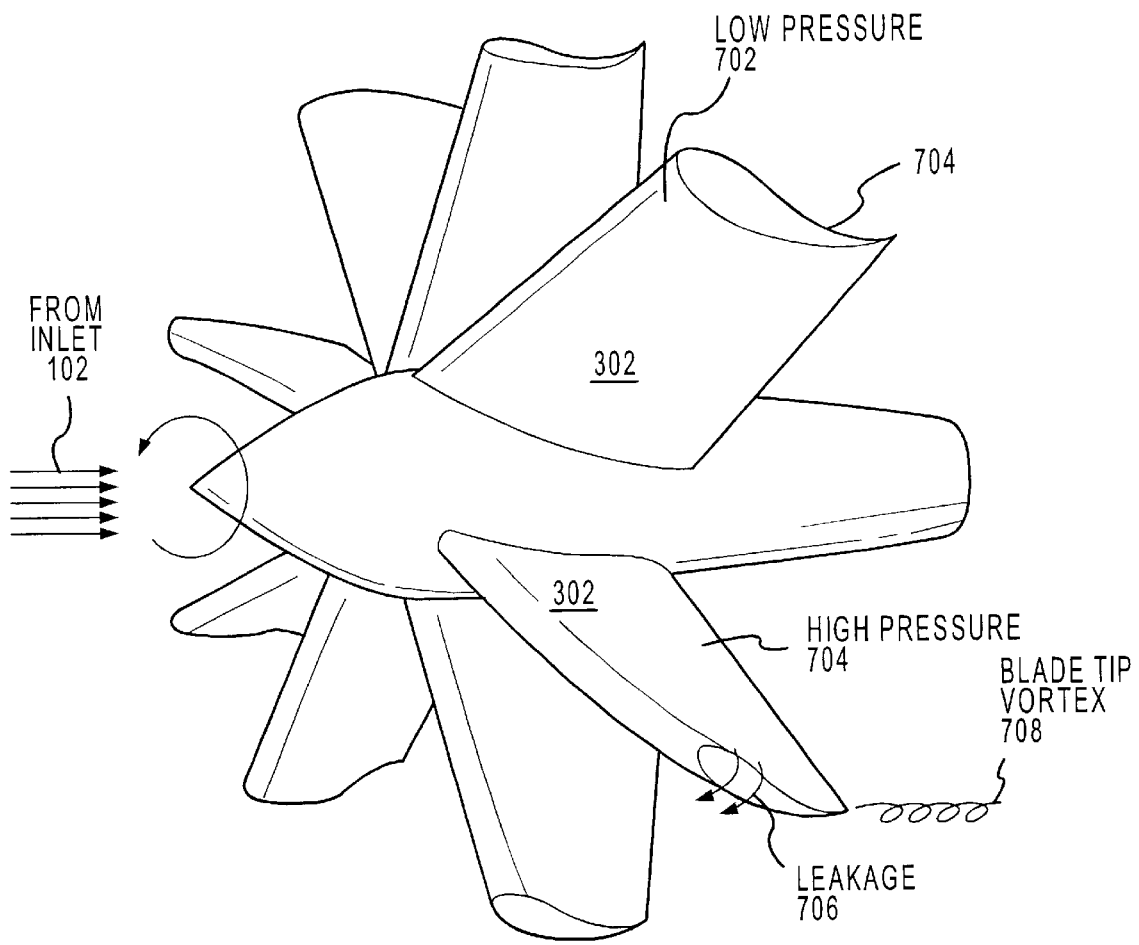
FIG. 7 is a partial, isometric view of a fan system depicting fluid leakage around the blade tips.

A fan noise control system 106 according to various aspects of the present invention may further include, or alternatively include, a fluid seal generator 122 disposed around the periphery of the interior wall 110 adjacent the blades 302. Fluid seal generator 122 includes, for example, a plurality of nozzles connected to the fluid source and is substantially aligned in the plane of rotation of the blades. The nozzles are configured to eject fluid from the fluid source to form an impediment to fluid flow in the upstream direction between the blades and the interior surface. The fluid seal generator 122 generates a fluid barrier at a blade-clearance gap 500 between the tips 502 of the blades 302 and the interior wall 110 of the housing 100 to inhibit leakage from the high pressure area behind blades 302 into the low pressure area in front of blades 302, and to delay the formation of blade tip vortex flows. That is, referring momentarily to FIG. 7, under operating conditions, the upstream area 702 in front of blades 302 experiences a lower dynamic pressure than the area 704 behind (downstream of) blades 302. This tends to cause fluid leakage 706 and create blade tip vortices 708. The present fluid seal generator 122 forms a fluid barrier which counteracts these effects.

It should be noted that the terms "barrier" and "seal" are not used to describe a solid or impenetrable structure, but to describe an impediment to upstream fluid flow in the blade-clearance gap 500. Consequently, fluid flow downstream from the blades 302 is more uniform and steady, thus reducing the associated broadband noise.

The fluid seal generator 122 suitably comprises any suitable system configured to impede flow between the high pressure area behind blades 302 to the low pressure area in front of blades 302. Referring again to FIG. 2, in the present embodiment, the fluid seal generator 122 suitably comprises an air seal ring (ASR) 140. The ASR 140 suitably comprises: a plurality of ASR CCSs 142; an ASR fluid supply 144; and an ASR duct 146 from the ASR fluid supply 144 to the ASR CCSs 142. The ASR 140 is suitably positioned adjacent the blade-clearance gap 502 to form a seal in the blade-clearance gap 502. Like the IGR fluid supply 130, the ASR fluid supply 144 may be a feedback connection from the power plant, an entirely independent source or a combination of multiple sources. In addition, the ASR 140 and the IGR 124 may use the same fluid supply or have separate fluid supplies. In the present embodiment, the IGR 124 and the ASR 140 suitably share the same fluid source comprising the feedback of fluid from the flow channel outlet 114. The ASR duct 146 is connected between the ASR fluid supply 144 and the ASR CCSs 142 to transfer fluid from the ASR fluid supply 144 to the ASR CCSs 142. The ASR duct 146 suitably comprises a substantially annular duct formed in the housing 100 and circumscribes the flow channel 102.

The ASR CCSs 142 are suitably configured to eject fluid from the ASR duct 146 into the blade-clearance gap 500. Like the IGR CCSs 126, the number, location, and configuration of the ASR CCSs 142 can be configured according to the fan system's 99 20 application, rotation speed, and size. Further, the ASR CCSs 142 may be configured according to any suitable size, shape, or manner to create the seal in the blade-clearance gap 502. For example, the ASR CCSs 142 may comprise any suitable sort of vent, nozzle, or other mechanism for providing a fluid.

In the present embodiment, for example, each of the ASR CCSs 142 extends from a position adjacent the leading edges 320 of the fan blades 302 to a second position adjacent the trailing edges 322 of the fan blades 302. In addition, the ASR CCSs 142 may be configured to control the thickness and direction of the fluid ejected from the ASR 140. In particular, the two walls of each ASR CCS 142 parallel to the longitudinal axis of the flow channel 102 may be configured to control the flow rate and direction of the fluid.

Figure 5:
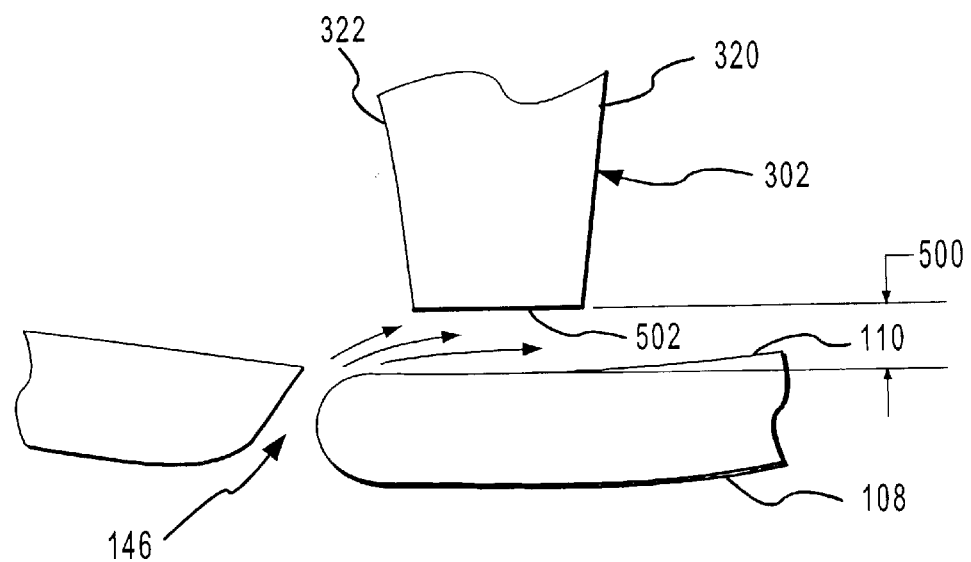
FIG. 5 is a detailed cross-sectional view of an ASR CCS.

For example, referring now to FIG. 5, a first surface C is suitably configured to eject fluid into the blade clearance gap 500 at approximately the inner boundary of the blade clearance gap 500. A second surface D suitably forms a rounded interface with the interior wall 110 of the housing 100 so that fluid flows along the interior wall 110. Thus, the surfaces C and D are appropriately configured to control the thickness and direction of the fluid flow such that the thickness of the fluid flow ejected from the ASR CCSs 142 of the ASR 140 is substantially the same thickness as the blade clearance gap 500 and the layer rotates in the same direction as the blades 302.

The ejected fluid from the ASR CCSs 142 forms a thin layer of fluid between the interior wall 110 of the housing 100 and the blades 302. The layer of fluid also travels along with the fan blade tips 502, establishing a fluid barrier which separates the downstream, higher pressure fluid region from the upstream, lower pressure fluid region. The ASR 140 stems leakage flow and inhibits the formation of blade tip vortices. In addition, the fluid ejected from the ASR CCSs 142 provides added force at the blade tip 502 to further unload the fan system 99.

In sum, a fan noise control system 106 according to various aspects of the present invention reduces noise. Blade-passing noise associated with the rotation rate of the blades 302 is reduced by the pre-swirl generator 120, which forms a layer of swirling fluid upstream of the blades 302. The layer of swirling fluid reduces the angular velocity differential between the blades 302 and the fluid in the flow channel 102. Consequently, noise associated with the rotation of the blades 302 diminishes.

In addition, the fan system 99 suitably includes a fluid seal generator 122 around the periphery of the blades 302. The fluid seal generator 122 forms a fluid seal between the blade tips 502 and the interior wall 110 of the housing 100. The fluid seal tends to separate the high pressure downstream fluid from the low pressure upstream fluid. Consequently, the fluid seal inhibits leakage flow through the blade clearance gap 500 and blade passage vortex flows, thus reducing the noise generated by the fan system 99.

It should be further noted that the pre-swirl generator 120 and the fluid seal generator 122 also enhance the performance of the engine and noise reduction by tending to unload the blades 302. In addition, the present noise control system 106 reduces noise without adding surfaces in the flow path that tend to generate vortices and further noise. The simplicity of the system facilitates maintenance, provides reliability, and the potential for integration into existing engines and other systems with rotating blades 302.

Finally, it should be noted that the pre-swirl generator 120 and the fluid seal generator 122 may operate independently of each other. Either the pre-swirl generator 120 or the fluid seal generator 122 may be individually employed to reduce noise in a particular system, or the two systems may both be included for a cumulative effect.

While the principles of the invention have now been made clear in illustrative embodiments, there will be immediately obvious to those skilled in the art many modifications of structure, arrangements, proportions, the elements, materials and components, used in the practice of the invention which are particularly adapted for a specific environment and operating requirements without departing from those principles.

What is claimed is:

1. A fan noise control system for controlling noise generated by a fan having an upstream direction, a downstream direction, and an interior surface defining a fluid flow channel, said fan noise control system comprising:

a pre-swirl generator configured to reduce fan noise by providing a layer of rotating fluid upstream of the fan, wherein the pressure of said layer of rotating fluid is substantially uniform at every angle in a plane parallel to the lane of rotation of said fan, wherein said layer of rotating fluid follows said interior surface in accordance with the Coanda effect.

2. A fan noise control system according to claim 1, wherein said pre-swirl generator comprises:

a fluid source; and a plurality of nozzles connected to said fluid source and positioned upstream of the fan, wherein said plurality of nozzles are configured to eject a fluid from said fluid source to form said layer of rotating fluid.

3. A fan noise control system according to claim 2, wherein said fluid source comprises a feedback from the fan.

4. A fan noise control system according to claim 2, wherein each of said plurality of nozzles comprises a circulation controlled slot formed in said interior surface.

5. A fan noise control system according to claim 4, wherein each said circulation controlled slot includes:

a first surface configured to guide fluid into said fluid flow channel near said interior surface such that the fluid substantially follows said interior surface in accordance with the Coanda effect; and a second surface configured to guide fluid into said fluid flow channel at a preselected angle away from the wall.

6. A fan system, comprising:

a housing having an interior surface defining a fluid flow channel, an inlet, and an outlet;

a plurality of blades configured to rotate within said fluid flow channel and propel fluid from said inlet towards said outlet;

a pre-swirl generator configured to reduce fan noise by providing a rotating layer of fluid between said inlet and said plurality of blades, wherein the pressure of said layer of rotating fluid is substantially uniform at every angle in a plane parallel to the plane of rotation of said plurality of blades, and wherein said rotating layer of fluid follows said interior surface in accordance with the Coanda effect; and a fluid seal generator configured to reduce fan noise by forming a fluid barrier between said plurality of blades and said interior surface to provide an impediment to fluid flow parallel to the upstream direction between the blades and the interior surface, wherein said fluid barrier follows said interior surface in accordance with the Coanda effect.

7. A fan system according to claim 6, further comprising a fluid source, and wherein said pre-swirl generator includes a plurality of nozzles mounted on said interior surface concentrically with a longitudinal axis of said flow channel, connected to said fluid source, wherein said plurality of nozzles is configured to eject a fluid from said fluid source to form said layer of rotating fluid.

8. A fan system according to claim 7, further comprising a second fluid source, and wherein said fluid seal generator includes a second plurality of nozzles mounted on said interior surface concentrically with said longitudinal axis of said flow channel, connected to said second fluid source, and substantially aligned in a plane of rotation of the blades, wherein said second plurality of nozzles is configured to eject a fluid from said second fluid source to form said barrier.

9. A fan system according to claim 8, wherein said first and second fluid sources are the same fluid source.

10. A fan system according to claim 9, wherein said fluid source comprises a feedback from the fan.

11. A fan system according to claim 8, wherein each of said plurality of nozzles comprises a circulation controlled slot formed in said interior surface.

12. A fan system according to claim 11, wherein each of said circulation controlled slots includes:

a first surface configured to guide fluid into said fluid flow channel near said interior surface such that the fluid substantially follows said interior surface in accordance with the Coanda effect; and a second surface configured to guide fluid into said fluid flow channel at a preselected angle away from said interior surface.

* * * * *